(12) United States Patent
Harihara Iyer et al.

(10) Patent No.: US 10,594,648 B2
(45) Date of Patent: Mar. 17, 2020

(54) PERSONAL MESSAGING ASSISTANT

(71) Applicant: Intel Corporation, Santa Clara, CA (US)

(72) Inventors: Sreeram Harihara Iyer, Bangalore (IN); Akashdeep Sharma, Jalandhar (IN); Ashesh Deep, Bangalore (IN); Praveen Kumar Ramakrishnan, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 1027 days.

(21) Appl. No.: 14/865,958

(22) Filed: Sep. 25, 2015

(65) Prior Publication Data

US 2017/0093787 A1 Mar. 30, 2017

(51) Int. Cl.
*H04L 12/58* (2006.01)

(52) U.S. Cl.
CPC .............. *H04L 51/36* (2013.01); *H04L 51/12* (2013.01); *H04L 51/32* (2013.01)

(58) Field of Classification Search
CPC .......... H04L 51/26; H04L 51/12; H04L 51/32
USPC ....................................................... 709/206
See application file for complete search history.

(56) References Cited

U.S. PATENT DOCUMENTS

| | | | |
|---|---|---|---|
| 2010/0082751 A1* | 4/2010 | Meijer | G06F 15/16 709/206 |
| 2010/0268682 A1 | 10/2010 | Lewis et al. | |
| 2014/0025752 A1 | 1/2014 | Deluca et al. | |
| 2014/0201215 A1 | 7/2014 | Benner et al. | |
| 2014/0230066 A1 | 8/2014 | Hurwitz et al. | |
| 2016/0219008 A1* | 7/2016 | Brisebois | H04L 51/12 |

FOREIGN PATENT DOCUMENTS

| | | |
|---|---|---|
| WO | 2015038702 | 3/2015 |
| WO | 2017052965 | 3/2017 |

OTHER PUBLICATIONS

"International Application Serial No. PCT/US2016/048623, International Search Report dated Nov. 30, 2016", 3 pgs.
"International Application Serial No. PCT/US2016/048623, Written Opinion dated Nov. 30, 2016", 7 pgs.
"International Application Serial No. PCT US2016 048623, Preliminary Report on Patentability dated Apr. 5, 2018", 9 pgs.

* cited by examiner

*Primary Examiner* — Wing F Chan
*Assistant Examiner* — Leon Y Tseng
(74) *Attorney, Agent, or Firm* — Schwegman Lundberg & Woessner, P.A.

(57) ABSTRACT

Various systems and methods for a personal messaging assistant system are described herein. A personal messaging assistant system comprises a display; a processor; and a memory, including instructions, which when executed on the processor, cause the processor to perform the operations comprising: receiving an indication to transmit a message from a sender, the message including a recipient and a body; determining a relationship between the sender and the recipient; determining a message context based on the body; determining whether the message context is consistent with the relationship; and presenting on the display, a warning when the message context is not consistent.

24 Claims, 9 Drawing Sheets

US 10,594,648 B2

PERSONAL MESSAGING ASSISTANT

TECHNICAL FIELD

Embodiments described herein generally relate to electronic communications and in particular, to a system to provide a personal messaging assistant.

BACKGROUND

Electronic messages come in many forms, including the rudimentary electrical telegraph to the modern instant messaging systems. Electronic mail (email), a common form of digital messaging, is largely a store-and-forward model, where emails to a recipient were stored for the recipient until the recipient connected to the mail server and retrieved the email. Various forms of text messaging have been available ranging from internet relay chat (IRC), short message service (SMS), and proprietary systems (e.g., AOL Instant Messenger).

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Systems and methods described herein provide a system for providing a personal messaging assistant. Many times, a message may be inadvertently addressed to a wrong recipient. For example, a message containing confidential company information may be addressed to a friend or a client. As another example, a very personal message may be addressed to a work colleague. Inadvertent messages such as these may irreparably damage a relationship, cause business losses, or even be the basis for termination, lawsuits or criminal prosecution. What is needed is an intelligent process to warn a sender of a potentially inappropriate message. In this document, a personal messaging assistant is provided that is able to compare the message context with the relationship between the sender and recipient. If there is a potential mistake, the assistant may intervene and allow the sender to perform a corrective action.

In general, the personal messaging assistant may be implemented as a layer that intercepts the outgoing messages from various applications (e.g., SMS, emails, or other forms of text messages), retrieves or determines the relationship between the sender and the recipient(s), analyzes the context of the message, and when there is a potential mismatch between the relationship and the context, warn the sender, who may then take corrective actions.

Figure 1:
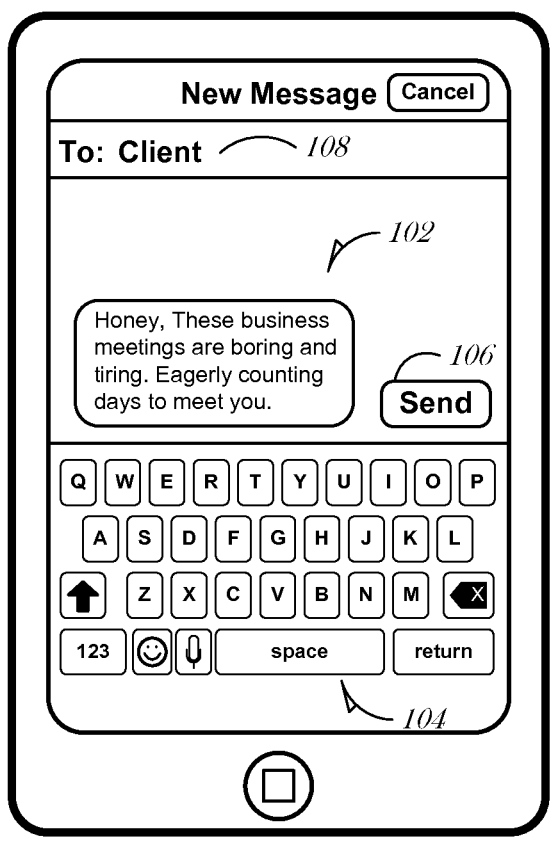
FIGS. 1 and 2 illustrate a user interface according to an embodiment.
Figure 2:
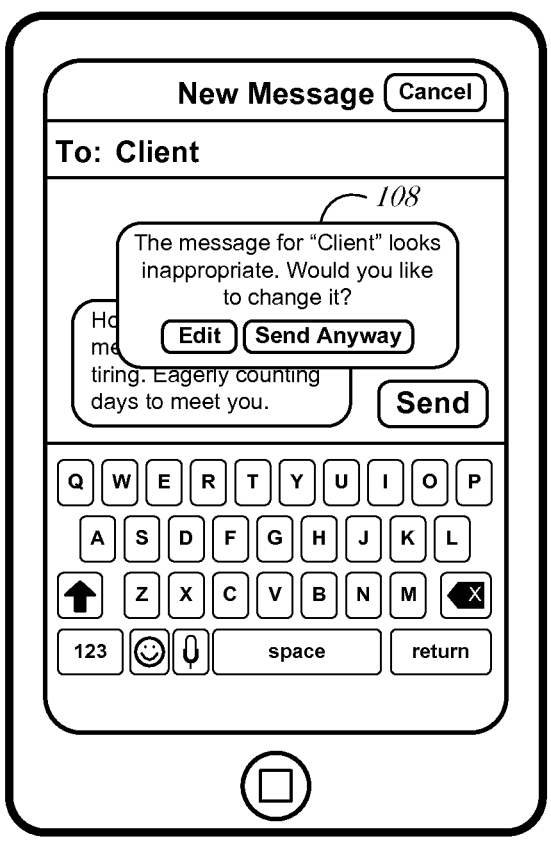

FIGS. 1 and 2 illustrate a user interface 100 according to an embodiment. The user interface 100 may be presented on any type of user device that includes or is connected to a display. The user device may be any type of compute device including, but not limited to a mobile phone, a smartphone, a phablet, a tablet, a personal digital assistant, a laptop, a digital camera, a desktop computer, an in-vehicle infotainment system, or the like. The user interface includes a text entry portion 102, a set of text input controls 104, and a send user interface control 106. After typing (or otherwise inputting) a message with the text input controls 104, a user may send the message to the recipient indicated in the "To:" line 108. In the use case illustrated in FIG. 1, the user mistakenly addressed the message to "Client" in the "To:" line 108 when composing a personal message. In FIG. 2, the personal messaging assistant may analyze the message content, the recipient, and the message context to determine that there may be a mistake in the recipient. The personal messaging assistant may provide one or more warnings or alerts to the user. For example, a dialog box 110 may be presented to warn the user of a potential error. If, for example, the client is also a personal friend, then the message may not be inappropriate. If the user sends the message anyway, the personal messaging assistant may make note of the decision of the user and modify the warning settings in future cases. Similarly, if the user edits the message, the personal messaging assistant may reinforce rules regarding possible errors.

Figure 3:
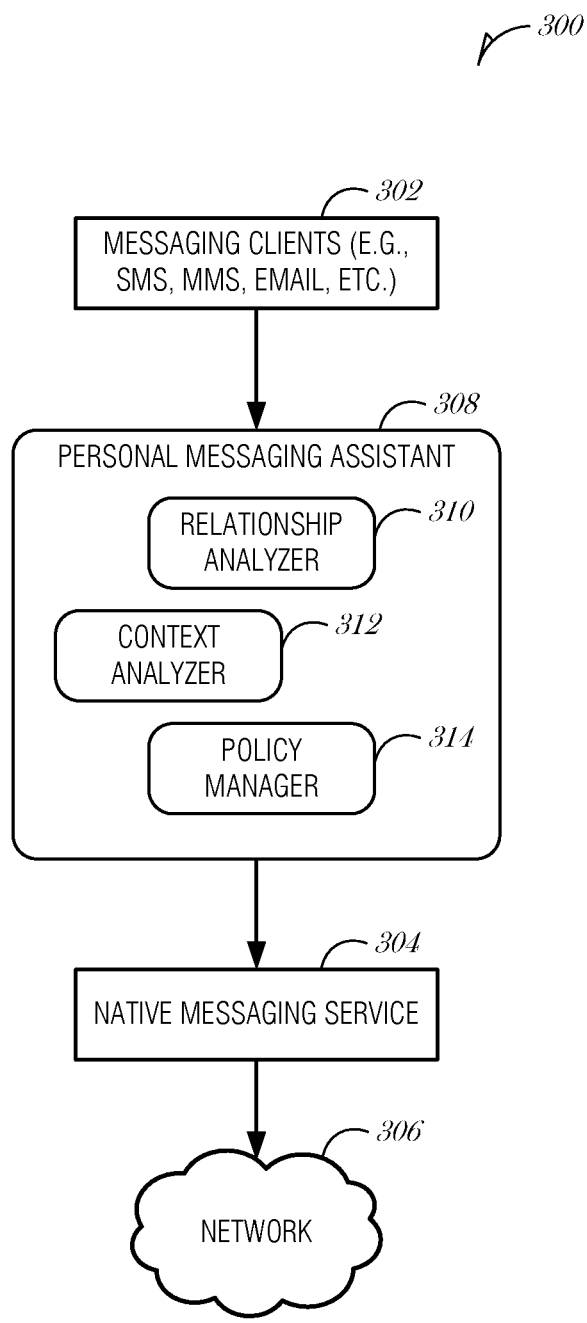
FIG. 3 is a block diagram illustrating the architecture of a personal messaging assistant, according to an embodiment.

FIG. 3 is a block diagram illustrating the architecture 300 of a personal messaging assistant, according to an embodiment. In conventional systems, a messaging client 302 interfaces with native messaging services 304 to send or receive messages. The messaging client 302 may be any user-level client that allows a user to compose, organize, transmit, receive, view, or otherwise manage messages. Examples of messaging clients 302 include an email client, a text messaging client, a social media application (e.g., FACEBOOK® client), a web browser, or the like. The messaging client 302 interfaces with the underlying hardware via the messaging services 304, wherein the messaging services 304 may include various drivers, interfaces, libraries, or other software or hardware elements that provide access to a communication network 306. Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). It is understood that messages include any type of digital or electronic message including, but not limited to short message service (SMS) communications, multimedia messaging service (MMS) communications, email, text messaging, and other proprietary messaging platforms (e.g., FACEBOOK® Messenger, TWITTER®, or America Online Instant Messenger (AOL IM)).

In an embodiment, a personal messaging assistant 308 is a framework that is inserted between the messaging client 302 and the native messaging service 304. The personal messaging assistant 308 include three components: a relationship analyzer 310, a context analyzer 312, and a policy manager 314. Using these components, the personal messaging assistant 308 is able to intercept an outgoing message from the messaging client 302, analyze it, and warn the user of a potentially mistaken message before causing embarrassment or other damage to the user.

In general, the relationship analyzer 310 identifies the relationship between the sender (e.g., user) and recipient. The context analyzer 312 identifies the context of the message and the policy manager 314 takes corrective action based on the context of the message and the relationship.

The relationship analyzer 310 may identify the relationship between the sender and the recipient using various mechanisms. In one instance, the relationship analyzer 310 accesses a social networking profile of the sender and of the recipient to determine whether a relationship exists and what type of relationship. For example, if the sender has a social networking profile that lists the recipient as a spouse, the relationship analyzer 310 may then conclude that there is a familial relationship. As another example, if the sender has a social networking profile listing an employer and the recipient has a profile listing the same employer, then the relationship analyzer 310 may determine that the sender and recipient are coworkers.

Another mechanism that the relationship analyzer 310 may use is a lightweight directory access protocol (LDAP) or similar to retrieve a directory of personnel, which may expose a hierarchy, and determine from the hierarchy the relationship between the sender and recipient.

Another mechanism that the relationship analyzer 310 may use involves a user's phone or contact list. For example, the relationship analyzer 310 may have access to, or may prompt for access to, a user's contact list. The relationship analyzer 310 may access more than one contact list. For example, the user may maintain a contact list on their mobile device, another contact list on a social networking website, and another contact list at a work server. Contact lists may also be dynamically created based on a message list (e.g., create a contact list from the email messages in the user's inbox). A contact list may include a relationship field where the user may input a relationship with the contact.

When a user tries to send a message, the user's relationship with the one or more recipients may be determined using one or more of the mechanisms described above. In the event that a relationship cannot be determined, the user may be prompted by the relationship analyzer 310 to define or provide a relationship. The user-provided relationship may be stored for later reference.

Relationships may be defined using various schema. For example, relationships may be defined broadly as "personal," "work," and "school." Then additional relationships may be defined as subcategories or subtypes of the general relationship categories, such as "personal-spouse," "personal-child," or "personal-aunt."

Figure 4:
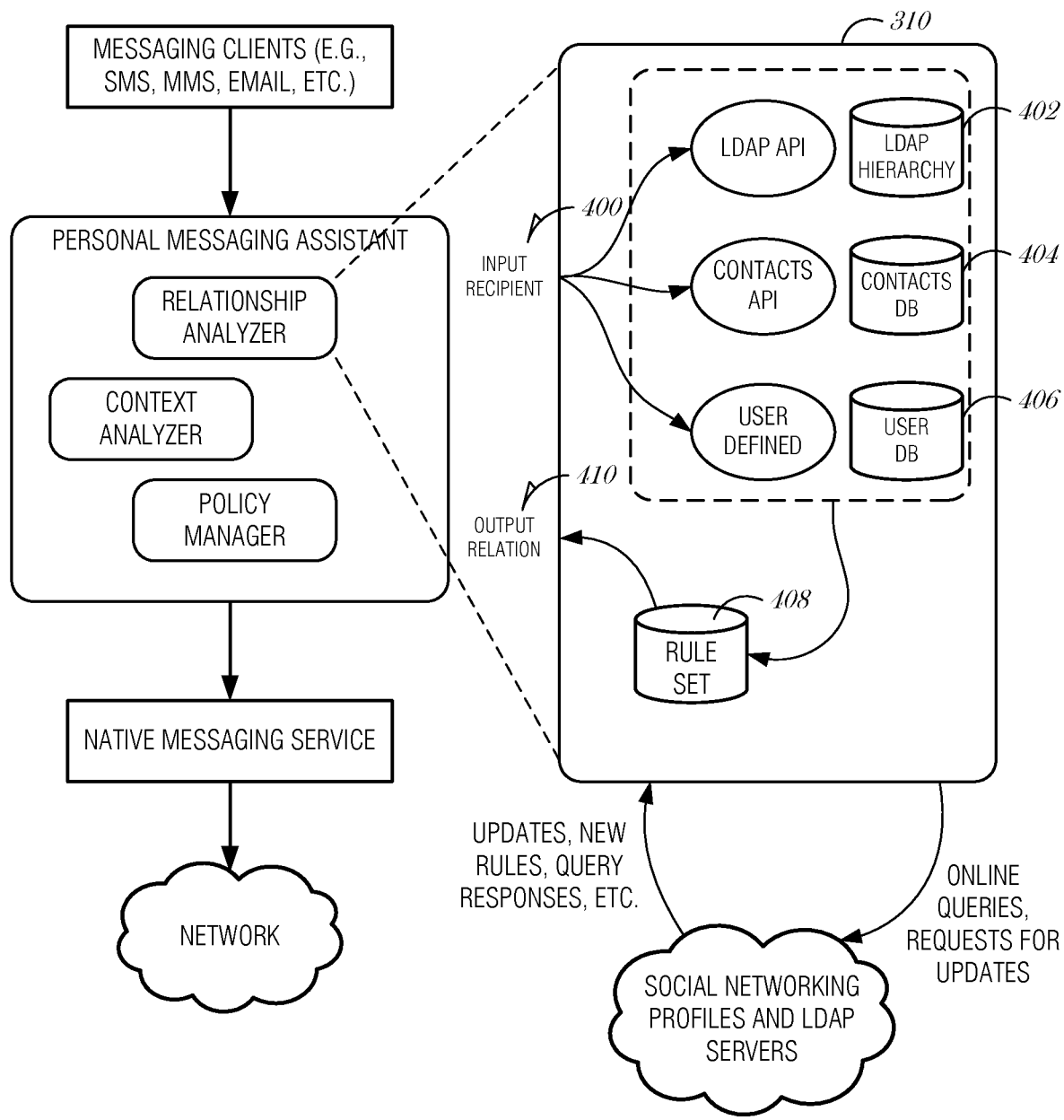
FIG. 4 is a schematic diagram illustrating the architecture of a relationship analyzer, according to an embodiment.

FIG. 4 is a schematic diagram illustrating the architecture of a relationship analyzer 310, according to an embodiment. Input 400 includes the recipient or recipients. The sender is assumed to be known in this context. The input 400 may be provided or used by one or more application programming interfaces (APIs) to determine whether there is a relationship and of what kind in an LDAP hierarchy 402, a contacts database 404, or a user database 406. The user database 406 may include relationships that the user has defined, such as through the user-defined API. Online queries may be used in addition to referencing local storage to determine the existence or kind of relationship. Local storage of the LDAP hierarchy 402, contacts database 404, user database 406, or other information may be updated or synchronized at various times, such as during a scheduled update or with push updates.

A rule set database 408 may be used to determine how a relationship is defined. The rule set database 408 may be used to analyze several layers of a relationship. For example, using a social network inquiry, the relationship analyzer 310 may determine that the sender and recipient are associated with the same organization. Then, using an LDAP inquiry, the relationship analyzer 310 may determine that the recipient is a manager in the organization and using a contacts database query, the relationship analyzer 310 may determine that the recipient is a member of the sales team. Using this information, the rule set database may determine that the recipient is very likely a coworker with no familial ties.

The relationship output 410 by the relationship analyzer 310 may be a single category or type or may include multiple categories or types, with each of the multiple categories or types having a weight, percentage, or bias. Continuing the example from above, the relation output 410 from the relationship analyzer 310 may be characterized across three categories: personal, work, and client, as personal: highly unlikely, work: highly likely, and client: moderately unlikely. The scale may be highly unlikely, moderately unlikely, unlikely, neutral, likely, moderately likely, and highly likely. Other metrics may be used such as percentages or a scaled numerical representation (e.g., 0-10 with 10 being more likely). Based on the type of likely relationship(s), the policy manager 314 may determine a particular course of action.

Figure 5:
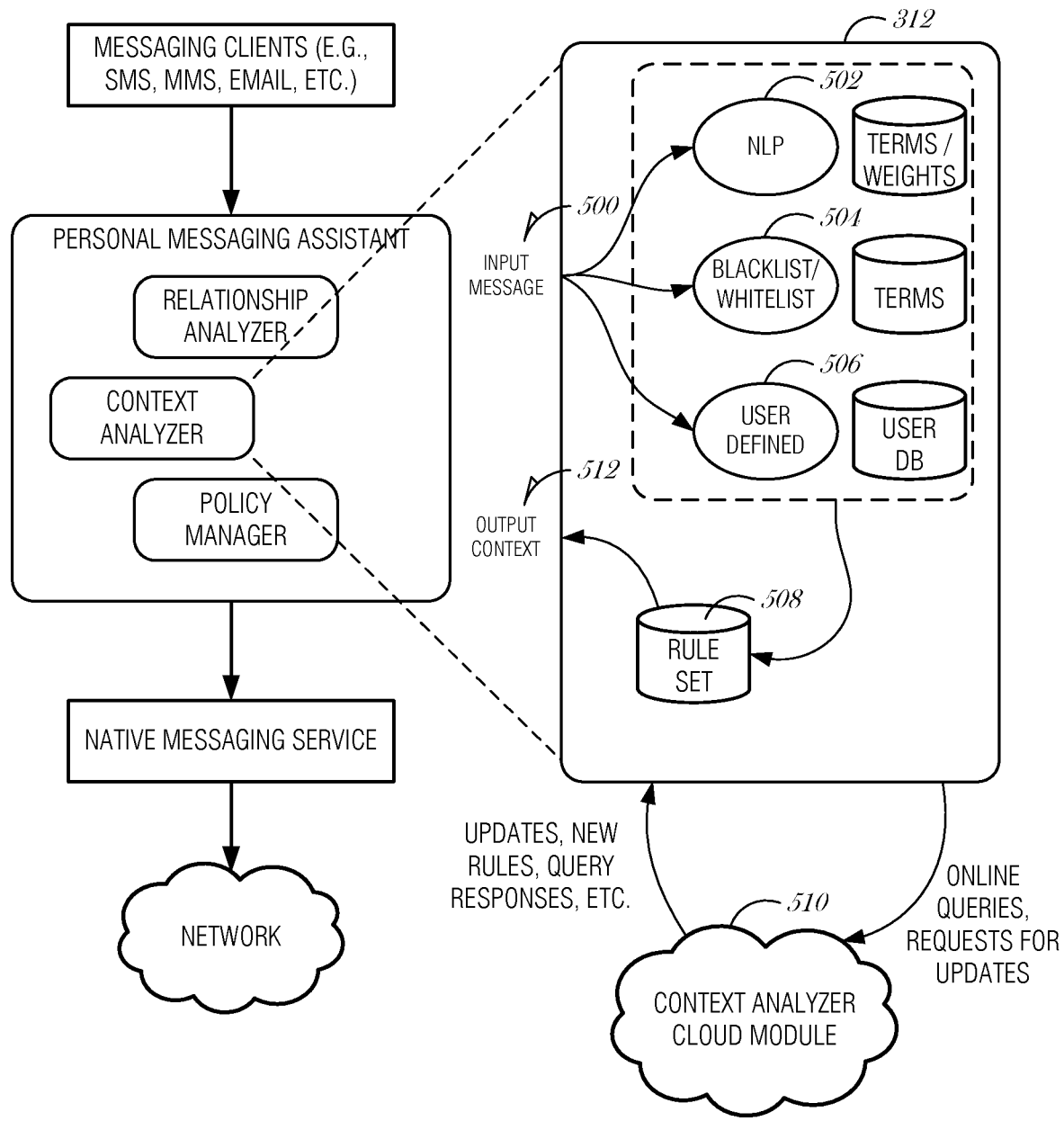
FIG. 5 is a schematic diagram illustrating the architecture of a context analyzer, according to an embodiment.

FIG. 5 is a schematic diagram illustrating the architecture of a context analyzer 312, according to an embodiment. In general, the context analyzer 312 may use a combination of natural language processing (NLP), dictionary-based filtering, and other related methods to classify the message. Classifications may be provided by a system provider or be defined by the user. Example classifications include private/personal and confidential/work-related. These two general classifications separate subject matter based on whether a communication is of a personal nature or a professional nature. Other classifications may be used, such as classification by different clients, classification by different people or groups of people in a family, business, church, or other organization, and the like. The context analyzer 312 may reside on a user device (e.g., a phone) or in the cloud (e.g., online).

When the context analyzer 312 receives an input of a message 500, the context analyzer 312 may analyze the message 500 using natural language processing 502, a blacklist/whitelist 504, or a user-defined list of terms 506. The natural language processing 502 may analyze the content and syntax of the message 500 to probabilistically classify the message 500 into one or more classifications.

The blacklist/whitelist 504 may be provided by a service provider, where the user-defined list of terms 506 may be provided by the user. The blacklist/whitelist 504 includes terms that are mapped to certain context categories. For example, the term "darling" may be mapped to a "personal" context category. As another example, the term "privileged" may be mapped to a "work" context category. A user may map certain terms to certain categories as well to suit their own needs. For example, a user whose spouse's nickname is "honeybear" may map the term "honeybear" to "personal."

The results from the natural language processing 502, blacklist/whitelist 504, and user-defined list of terms 506 may be combined based on rules defined in the rule set 508. The rules in rule set 508 may include weights or preferences for the results from the natural language processing 502, blacklist/whitelist 504, or user-defined list of terms 506.

The context analyzer 312 may communicate with a context analyzer cloud module 510, which may provide processing services, additional rules or terms, updates to existing databases in the context analyzer 312, and the like. The context analyzer cloud module 510 may access other sources of data, such as a time server, a geographical map server, etc. to augment analysis by the context analyzer 312. Other features of the message 500 may also be analyzed to determine context, such as the length of the message 500, the writing style used (e.g., more proper grammar or a longer salutation may indicate it is a work-oriented message), and grammar (e.g., use of acronyms or texting shorthand may indicate a more informal/personal message).

An output context 512 is created from the rule set 508. The output context 512 may be a particular classification of context from a list of contexts. For example, the context classification list may include: personal, work, and sensitive. The output context 512 may be one of the context classifications, e.g., "personal" or may be a statistical probability of each of the classifications, e.g., "personal 60%," "work 24%," and "sensitive 16%." Alternatively, the output context 512 may be represented as a mathematical representation. In an embodiment, the output context 412 is measured as a sensitivity quotient. The sensitivity quotient may represent how "sensitive" a message content is. Sensitivity may be measured with respect to client or business confidentiality. As such, a highly personal note may be ranked with a relatively low sensitivity quotient.

Figure 6:
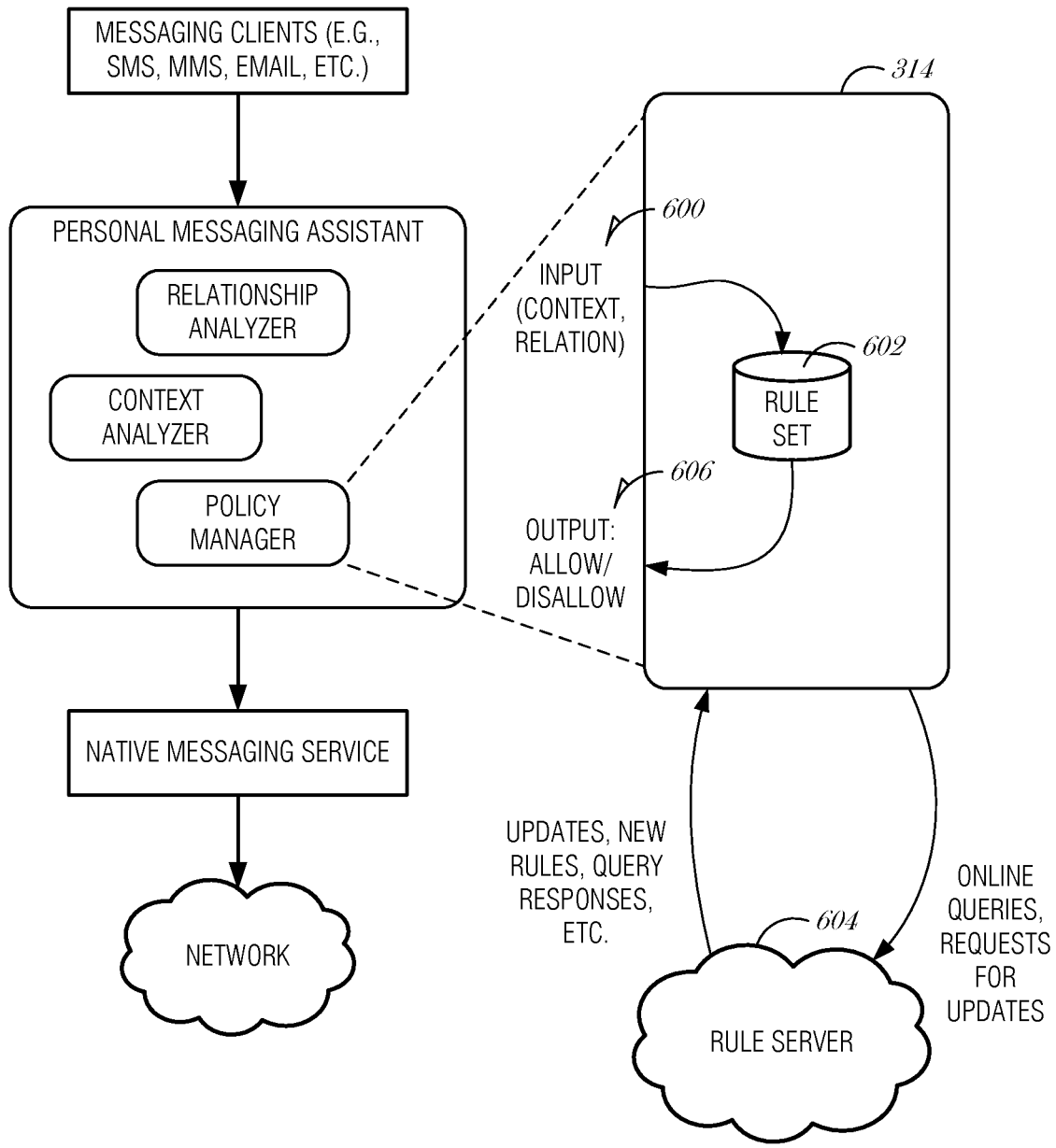
FIG. 6 is a schematic diagram illustrating the architecture of a policy manager, according to an embodiment.

FIG. 6 is a schematic diagram illustrating the architecture of a policy manager 314, according to an embodiment. The policy manager 314 receives input 600 of a message context and relationship between the sender and recipient. Based on rules in a rule set database 602, the policy manager 314 determines whether the message context is appropriate with respect to the relationship. The policy manager 314 may refer to an online rule server 604, which may store rules that are based on different regions or cultures and used to augment or initialize the policy manager 314. The rules in the online rule server 604 may be updated from one device and used on a different device. In this way, the user may synchronize rules among several user devices. The policy manager 314 outputs a decision 606 of whether to allow or disallow the message (e.g., whether to send or hold the message). Based on the output 606 of the policy manager 314, the personal messaging assistant 208 may present a warning, audible alert, or other indication to the user to warn the user of a potentially mistaken message. In response, the user may revise the recipient, revise the message, or allow the message to be sent as is.

The policy manager 314 may learn the user's behavior over time and adjust rules and reactions to the behavior. For example, if a user acknowledges a potential mismatch and sends company confidential information to his spouse, who is not affiliated directly with the company, then the policy manager 314 may create and manage a rule in the rule set database 602 that allows company confidential information to be sent to the particular recipient. The rule may be managed by the user, for example to delete the rule after circumstances have changed.

Figure 7:
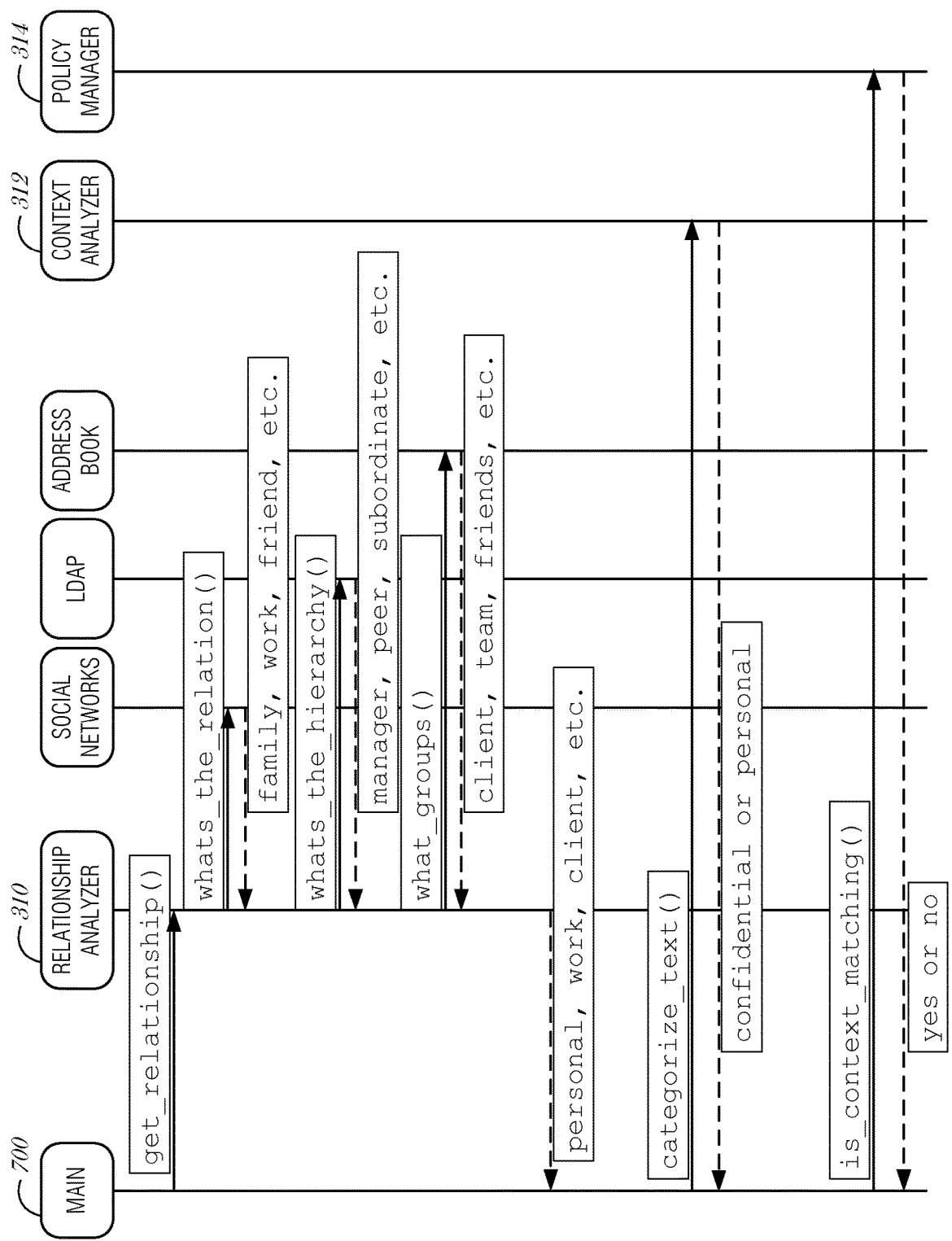
FIG. 7 is a swim lane diagram illustrating the interactions between the various components of the personal messaging assistant, according to an embodiment.

FIG. 7 is a swim lane diagram illustrating the interactions between the various components of the personal messaging assistant 208, according to an embodiment. A main routine 700 may invoke a function get_relationship( ) to access the relationship analyzer 310. Optionally, the relationship analyzer 310 may send an inquiry to various social networks using a function whats_the_relation( ). The social networks may provide information that the recipient is related to the sender as a family member, coworker, friend, etc. Optionally, the relationship analyzer 310 may send an inquiry to the LDAP API with whats_the_hierarchy( ) to determine whether the recipient is related to the sender in some organizational hierarchy. The recipient may be a manger, peer, subordinate, team member, geographically similar, etc. Optionally, the relationship analyzer 310 may use a function what_groups( ) to determine if the recipient is a member of an email group, contact list, or other collection stored in an address book or contacts database. The relationship analyzer 310 may then return the one or more relationships discovered to the main routine 700.

After determining the relationships, the main routine 700 may pass the message to the context analyzer 312. Using various operations discussed above, the context analyzer 312 may determine a context of the message and classify the message as confidential, personal, or the like. A rating, classification, or other label is returned to the main routine 700. It is understood that the relationship analyzer 310 and the context analyzer 312 may operate in parallel and that the main routine 700 may obtain relationships and message context substantially simultaneously.

After obtaining the relationship between the sender and the recipient and the message context, the main routine 700 invokes the policy manager 314 with the function is_context_matching( ). As affirmative or negative response is returned from the policy manager 314. If the return value indicates that the context does not match the relationship (or likely does not match), the main routine 700 may provide an alert to the user, which may include a visual presentation of a confirmation box with a warning, for example. If, however, the return value indicates that the context does match (or likely matches), then the main routine 700 may simply allow the message to be transmitted to the recipient using the conventional messaging layers.

Figure 8:
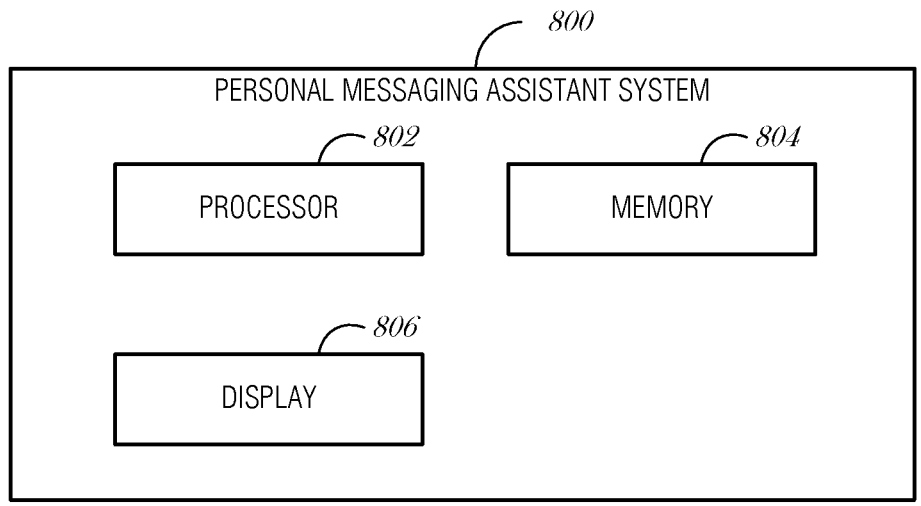
FIG. 8 is a block diagram illustrating a personal messaging assistant system, according to an embodiment.

FIG. 8 is a block diagram illustrating a personal messaging assistant system 800, according to an embodiment. The system 800 includes a processor 802, and a memory 804. The memory 804 may include instructions, which when executed on the processor 802, cause the processor 802 to receive an indication to transmit a message from a sender, the message including a recipient and a body. The indication may be when the user activates a control to send a message, for example with a send button in a user interface.

The processor 802 may then determine a relationship between the sender and the recipient. In an embodiment, determining the relationship between the sender and the recipient comprises accessing a social media platform; querying the social media platform for an attribute of the recipient; and determining an aspect of the relationship between the sender and the recipient based on the attribute of the recipient. In various embodiments, the attribute of the recipient is a familial role, a workplace, a school, or a social media connection. For example, the recipient may maintain a social media profile and provide a familial relationship (e.g., John's Mom), familial role (e.g., mother), residential city or address, profession, or work city or address. This information may be cross-referenced with other information from the recipient's social media profile or profiles from several social media accounts. The information may also be cross-referenced with information related to the sender's social media accounts.

In an embodiment, determining the relationship between the sender and the recipient comprises accessing a computer directory service; querying the computer directory service for an attribute of the recipient; and determining an aspect of the relationship between the sender and the recipient based on the attribute of the recipient. The computer directory service may be an LDAP service. In various embodiments, the attribute of the recipient is a position, a title, a group membership, a location, an office, or a rank. The position may be a general position in a hierarchy (e.g., accountant) where the title may be a more specific indication of the recipient's employment (e.g., Senior Accountant II). The location may be a general office location, such as the Chicago Office or the Minnesota Office. Rank may be an indication of a military or paramilitary rank, such as Corporal.

In an embodiment, determining the relationship between the sender and the recipient comprises accessing a contact database; querying the contact database service for an attribute of the recipient; and determining an aspect of the relationship between the sender and the recipient based on the attribute of the recipient. The contact database may be stored on the sender's user device. The contact database may be an address book. The contact database may be associated with the messaging client that the sender is using to compose the message. In various embodiments, the attribute of the recipient is an email distribution list or a company. For example, the contact database may be organized with distribution lists for different tasks, such as "family," "soccer team," or "work buddies." A contact may be in one or more distribution lists. The distribution lists may generally be oriented around personal or professional settings, which may be used to determine the relationship between the sender and the recipient. As another example, the records of contacts in the contact database may include a field for a company, place of work, company email, work phone, or the like. If the field is used and the company listed matches the sender's employer, then it may be inferred that the relationship is a professional one.

In an embodiment, determining the relationship between the sender and the recipient comprises accessing a user-managed database and querying the user-managed database for the relationship. The user (e.g., sender) may manage a relation database that specifically associates a recipient with the sender using a defined relationship. For example, the sender may associate "Kathy Norman" with the relationship "Mom."

The processor 802 may then determine a message context based on the body. In an embodiment, determining the message context based on the body comprises implementing a natural language processor to determine a content of the body and using a rule set to determine the message context based on the content.

In an embodiment, determining the message context based on the body comprises implementing a blacklist or a whitelist to determine an aspect of the message context and using a rule set to determine the message context based on the aspect of the message context. The blacklist may be words that when present in a message, make the message always resolve to a professional or highly sensitive characterization. The whitelist may be words that when present in the message, make the message always resolve to a personal or low sensitive message. The blacklist and whitelist may be reversed in their operation.

In an embodiment, determining the message context based on the body comprises determining the message context based on a user-defined set of words. In some embodiments, the blacklist and whitelist are provided by a system provider or hardcoded into the messaging client or are default terms used in a personal messaging assistant. To provide additional functionality, a capability for the user to have a user-defined set of words may be provided. The user-defined set of words may act similar to the blacklist/whitelist, such that when certain words chosen by the user exist in a message, then the message is automatically characterized in a certain way.

In an embodiment, the message context comprises a selected one of an ordered list of message context types. The ordered list may be something like: highly sensitive, sensitive, neutral, personal, highly personal. Another example ordered list may be: very sensitive, sensitive, neutral, not sensitive, not sensitive at all. Numerical or other metrics may be used in the ordered list.

In an embodiment, the message context comprises a mathematical value representing a level of confidentiality. One example is the sensitivity quotient discussed above. Another example may be a ratio or percentage of sensitive to not sensitive.

The processor 802 may then determine whether the message context is consistent with the relationship. In an embodiment, determining whether the message context is consistent with the relationship comprises classifying the relationship on a personal-to-professional scale to obtain a personal-to-professional metric and comparing the personal-to-professional metric with the message context to determine whether the message context is consistent with the relationship. The personal-to-professional metric may be an indication of where on a scale of say one to ten, a person is related to the sender at a personal level or more of a professional level. For example, the sender's brother may be a one on the scale. However, if the sender's brother also works with the sender, then the brother may be a four or a five. If the sender's brother is also the sender's boss at the place they work, then the relationship may be a six or seven.

In an embodiment, determining whether the message context is consistent with the relationship comprises accessing a rule set database, the rule set database including mappings from a plurality of social groups to a plurality of message context sensitivities; classifying the recipient in a social group of the plurality of social groups; classifying the message context in a sensitivity level of the plurality of message context sensitivities; and using a rule from the rule set database to determining whether the message context is consistent with the relationship based on the mapping between the social group and the sensitivity level.

Social groups may be defined by the system provider or by the user (e.g., sender). Example social groups include, but are not limited to "golf buddies," "family," "management team," "Project Echo Team Members," and the like. The sensitivity level may be scaled, such as from one to one-hundred or some other scale, or be grouped in gross categories. For example, message context sensitivities may be labeled as: "high," "medium," and "low." Each of the social groups may be mapped to a sensitivity level—either numerical or labeled group. Based on which social group or groups the recipient is found in, the message context may be set at a particular sensitivity. If the recipient exists in more than one social group, then one of several mechanisms may be used, such as averaging sensitivities, using the highest or lowest sensitivity, or other ways of mathematically combining the sensitivities associated with the multiple social groups.

After determining whether the message context is consistent with the relationship, the processor 802 may present on a display 806, a warning when the message context is not consistent. In an embodiment, presenting a warning when the message context is not consistent comprises presenting a graphical user interface control to the sender, the graphical user interface control including a confirmation control to bypass the warning and transmit the message.

Figure 9:
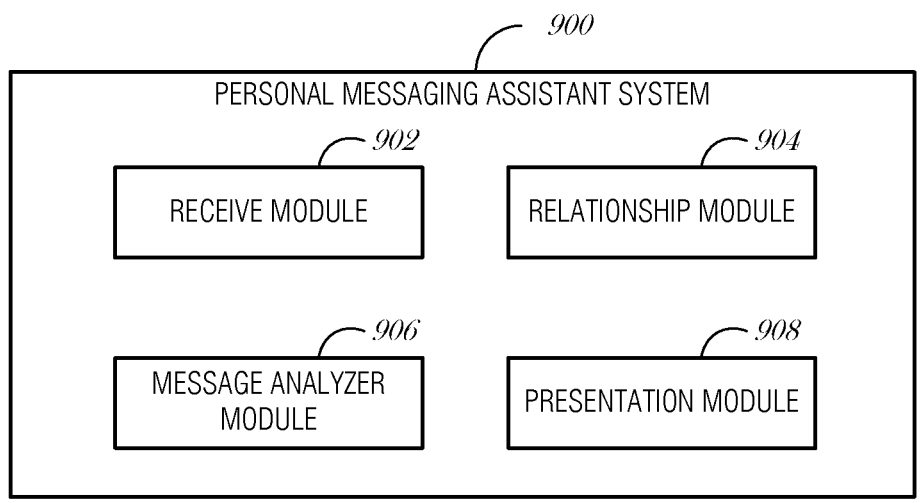
FIG. 9 is a block diagram illustrating a personal messaging assistant system, according to an embodiment.

FIG. 9 is a block diagram illustrating a personal messaging assistant system 900, according to an embodiment. The system 900 includes a receive module 902, a relationship module 904, a message analyzer module 906, and a presentation module 908. The receive module 902 may be configured to receive an indication to transmit a message from a sender, the message including a recipient and a body. The relationship module 904 may be configured to determine a relationship between the sender and the recipient. The message analyzer module 906 may be configured to determine a message context based on the body and determining whether the message context is consistent with the relationship. The presentation module 908 may be configured to present a warning when the message context is not consistent.

In an embodiment, to determine the relationship between the sender and the recipient, the relationship module 904 is to access a social media platform; query the social media platform for an attribute of the recipient; and determine an aspect of the relationship between the sender and the recipient based on the attribute of the recipient. For example, the social media platform (e.g., FACEBOOK®) may provide an application programming interface (API) such that an authorized client may query the social media platform's databases to obtain social connections to a source person. In embodiments, the attribute of the recipient is a familial role, a workplace, a school, or a social media connection.

In an embodiment, to determine the relationship between the sender and the recipient, the relationship module 904 is to access a computer directory service; query the computer directory service for an attribute of the recipient; and determine an aspect of the relationship between the sender and the recipient based on the attribute of the recipient. In embodiments, the attribute of the recipient is a position, a title, a group membership, a location, an office, or a rank.

In an embodiment, to determine the relationship between the sender and the recipient, the relationship module 904 is to access a contact database; query the contact database service for an attribute of the recipient; and determine an aspect of the relationship between the sender and the recipient based on the attribute of the recipient. The contact database may be an email list, phone list, contact database, or other data store on a local or remote machine. In embodiments, the attribute of the recipient is an email distribution list or a company.

In an embodiment, to determine the relationship between the sender and the recipient, the relationship module 904 is to access a user-managed database; and query the user-managed database for the relationship. For example, a user may be provided a client program to manage relationships. This client program may be separate from other contact databases or email lists available on the user's device.

In an embodiment, to determine the message context based on the body, the message analyzer module 906 is to implement a natural language processor to determine a content of the body and use a rule set to determine the message context based on the content.

In an embodiment, to determine the message context based on the body, the message analyzer module 906 is to implement a blacklist or a whitelist to determine an aspect of the message context and use a rule set to determine the message context based on the aspect of the message context. The aspects may be the sender, time of delivery, time sent, keywords in the message body or subject, email distribution lists the message was sent to, etc. The blacklist or whitelist may be provided by the entity that provides the message assistant.

In an embodiment, to determine the message context based on the body, the message analyzer module 906 is to determine the message context based on a user-defined set of words. The user-defined set of words may augment a default blacklist or whitelist.

In an embodiment, the message context comprises a selected one of an ordered list of message context types.

In an embodiment, the message context comprises a mathematical value representing a level of confidentiality.

In an embodiment, to determine whether the message context is consistent with the relationship, the message analyzer module 906 is to classify the relationship on a personal-to-professional scale to obtain a personal-to-professional metric and compare the personal-to-professional metric with the message context to determine whether the message context is consistent with the relationship. The personal-to-professional scale may be a one to ten rating, with highly personal rated as a one and highly-professional as a ten.

In an embodiment, to determine whether the message context is consistent with the relationship, the message analyzer module 906 is to access a rule set database, the rule set database including mappings from a plurality of social groups to a plurality of message context sensitivities; classify the recipient in a social group of the plurality of social groups; classify the message context in a sensitivity level of the plurality of message context sensitivities; and use a rule from the rule set database to determining whether the message context is consistent with the relationship based on the mapping between the social group and the sensitivity level.

In an embodiment, to present the warning when the message context is not consistent, the presentation module 908 is to present a graphical user interface control to the sender, the graphical user interface control including a confirmation control to bypass the warning and transmit the message. An example of a graphical user interface control is in FIG. 1B at item 108.

Figure 10:
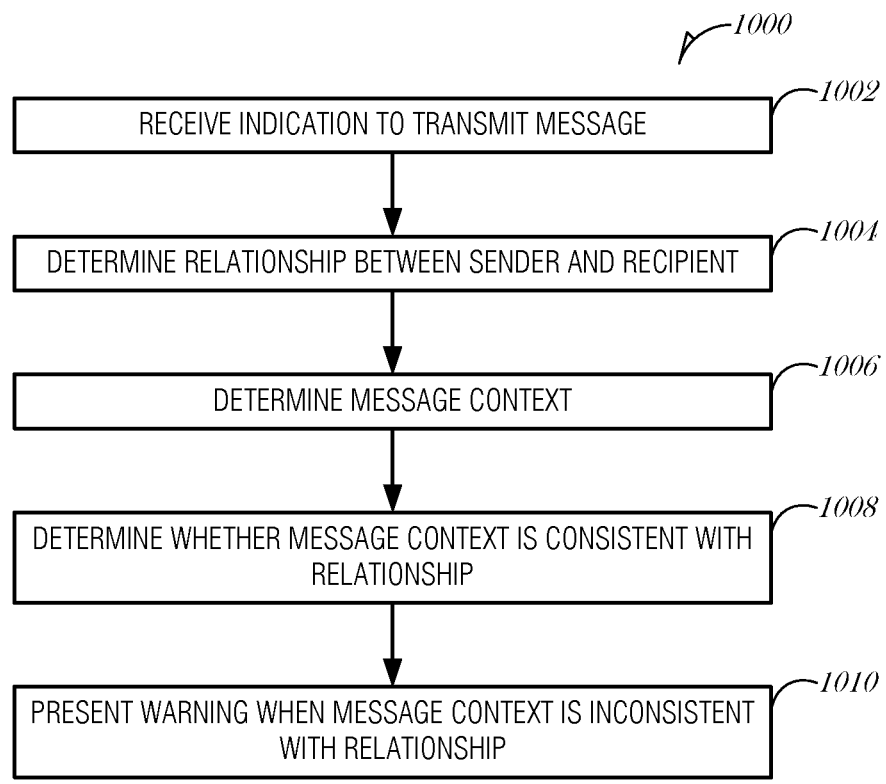
FIG. 10 is a flowchart illustrating a method of providing a personal messaging assistant, according to an embodiment.

FIG. 10 is a flowchart illustrating a method 1000 of providing a personal messaging assistant, according to an embodiment. At block 1002, an indication to transmit a message from a sender is received at a client device, where the message including a recipient and a body.

At block 1004, a relationship between the sender and the recipient is determined. In an embodiment, determining the message context based on the body comprises implementing a natural language processor to determine a content of the body; and using a rule set to determine the message context based on the content.

In an embodiment, determining the relationship between the sender and the recipient comprises accessing a social media platform; querying the social media platform for an attribute of the recipient; and determining an aspect of the relationship between the sender and the recipient based on the attribute of the recipient. In a further embodiment, the attribute of the recipient is a familial role, a workplace, a school, or a social media connection.

In an embodiment, determining the relationship between the sender and the recipient comprises accessing a computer directory service; querying the computer directory service for an attribute of the recipient; and determining an aspect of the relationship between the sender and the recipient based on the attribute of the recipient. In a further embodiment, the attribute of the recipient is a position, a title, a group membership, a location, an office, or a rank.

In an embodiment, determining the relationship between the sender and the recipient comprises accessing a contact database; querying the contact database service for an attribute of the recipient; and determining an aspect of the relationship between the sender and the recipient based on the attribute of the recipient. In a further embodiment, the attribute of the recipient is an email distribution list or a company.

In an embodiment, determining the relationship between the sender and the recipient comprises accessing a user-managed database; and querying the user-managed database for the relationship.

At block 1006, a message context is determined based on the body.

In an embodiment, determining the message context based on the body comprises implementing a blacklist or a whitelist to determine an aspect of the message context; and using a rule set to determine the message context based on the aspect of the message context.

In an embodiment, determining the message context based on the body comprises determining the message context based on a user-defined set of words.

In an embodiment, the message context comprises a selected one of an ordered list of message context types. In an embodiment, the message context comprises a mathematical value representing a level of confidentiality.

At block 1008, it is determined whether the message context is consistent with the relationship.

In an embodiment, determining whether the message context is consistent with the relationship comprises classifying the relationship on a personal-to-professional scale to obtain a personal-to-professional metric; and comparing the personal-to-professional metric with the message context to determine whether the message context is consistent with the relationship.

In an embodiment, determining whether the message context is consistent with the relationship comprises accessing a rule set database, the rule set database including mappings from a plurality of social groups to a plurality of message context sensitivities; classifying the recipient in a social group of the plurality of social groups; classifying the message context in a sensitivity level of the plurality of message context sensitivities; and using a rule from the rule set database to determining whether the message context is consistent with the relationship based on the mapping between the social group and the sensitivity level.

At block 1010, a warning is presented when the message context is not consistent. In an embodiment, presenting a warning when the message context is not consistent comprises presenting a graphical user interface control to the sender, the graphical user interface control including a confirmation control to bypass the warning and transmit the message.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 11:
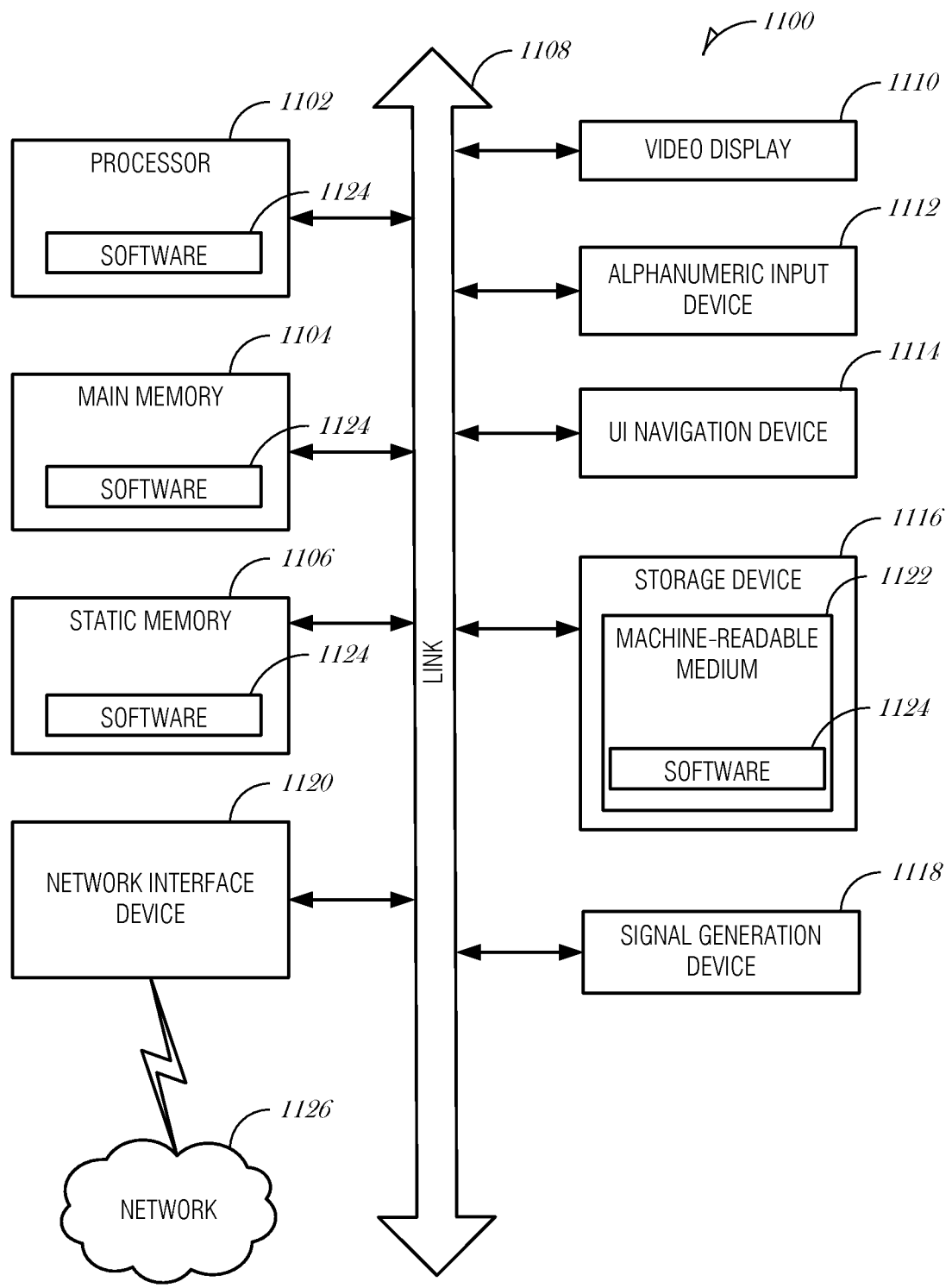
FIG. 11 is a block diagram illustrating an example machine upon which any one or more of the techniques (e.g., methodologies) discussed herein may perform, according to an example embodiment.

FIG. 11 is a block diagram illustrating a machine in the example form of a computer system 1100, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, set-top box, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1100 includes at least one processor 1102 (e.g., a central processing unit (CPU), a graphics processing unit (GPU) or both, processor cores, compute nodes, etc.), a main memory 1104 and a static memory 1106, which communicate with each other via a link 1108 (e.g., bus). The computer system 1100 may further include a video display unit 1110, an alphanumeric input device 1112 (e.g., a keyboard), and a user interface (UI) navigation device 1114 (e.g., a mouse). In one embodiment, the video display unit 1110, input device 1112 and UI navigation device 1114 are incorporated into a touch screen display. The computer system 1100 may additionally include a storage device 1116 (e.g., a drive unit), a signal generation device 1118 (e.g., a speaker), a network interface device 1120, and one or more sensors (not shown), such as a global positioning system (GPS) sensor, compass, accelerometer, or other sensor.

The storage device 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104, static memory 1106, and/or within the processor 1102 during execution thereof by the computer system 1100, with the main memory 1104, static memory 1106, and the processor 1102 also constituting machine-readable media.

While the machine-readable medium 1122 is illustrated in an example embodiment to be a single medium, the term "machine-readable medium" may include a single medium or multiple media (e.g., a centralized or distributed database, and/or associated caches and servers) that store the one or more instructions 1124. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1124 may further be transmitted or received over a communications network 1126 using a transmission medium via the network interface device 1120 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 includes subject matter for a personal messaging assistant (such as a device, apparatus, or machine) comprising: a receive module to receive an indication to transmit a message from a sender, the message including a recipient and a body; a relationship module to determine a relationship between the sender and the recipient; a message analyzer module to determine a message context based on the body and determining whether the message context is consistent with the relationship; and a presentation module to present a warning when the message context is not consistent.

In Example 2, the subject matter of Example 1 may include, wherein to determine the relationship between the sender and the recipient, the relationship module is to: access a social media platform; query the social media platform for an attribute of the recipient; and determine an aspect of the relationship between the sender and the recipient based on the attribute of the recipient.

In Example 3, the subject matter of any one of Examples 1 to 2 may include, wherein the attribute of the recipient is a familial role, a workplace, a school, or a social media connection.

In Example 4, the subject matter of any one of Examples 1 to 3 may include, wherein to determine the relationship between the sender and the recipient, the relationship module is to: access a computer directory service; query the computer directory service for an attribute of the recipient; and determine an aspect of the relationship between the sender and the recipient based on the attribute of the recipient.

In Example 5, the subject matter of any one of Examples 1 to 4 may include, wherein the attribute of the recipient is a position, a title, a group membership, a location, an office, or a rank.

In Example 6, the subject matter of any one of Examples 1 to 5 may include, wherein to determine the relationship between the sender and the recipient, the relationship module is to: access a contact database; query the contact database service for an attribute of the recipient; and determine an aspect of the relationship between the sender and the recipient based on the attribute of the recipient.

In Example 7, the subject matter of any one of Examples 1 to 6 may include, wherein the attribute of the recipient is an email distribution list or a company.

In Example 8, the subject matter of any one of Examples 1 to 7 may include, wherein to determine the relationship between the sender and the recipient, the relationship module is to: access a user-managed database; and query the user-managed database for the relationship.

In Example 9, the subject matter of any one of Examples 1 to 8 may include, wherein to determine the message context based on the body, the message analyzer module is to: implement a natural language processor to determine a content of the body; and use a rule set to determine the message context based on the content.

In Example 10, the subject matter of any one of Examples 1 to 9 may include, wherein to determine the message context based on the body, the message analyzer module is to: implement a blacklist or a whitelist to determine an aspect of the message context; and use a rule set to determine the message context based on the aspect of the message context.

In Example 11, the subject matter of any one of Examples 1 to 10 may include, wherein to determine the message context based on the body, the message analyzer module is to: determine the message context based on a user-defined set of words.

In Example 12, the subject matter of any one of Examples 1 to 11 may include, wherein the message context comprises a selected one of an ordered list of message context types.

In Example 13, the subject matter of any one of Examples 1 to 12 may include, wherein the message context comprises a mathematical value representing a level of confidentiality.

In Example 14, the subject matter of any one of Examples 1 to 13 may include, wherein to determine whether the message context is consistent with the relationship, the message analyzer module is to: classify the relationship on a personal-to-professional scale to obtain a personal-to-professional metric; and compare the personal-to-professional metric with the message context to determine whether the message context is consistent with the relationship.

In Example 15, the subject matter of any one of Examples 1 to 14 may include, wherein to determine whether the message context is consistent with the relationship, the message analyzer module is to: access a rule set database, the rule set database including mappings from a plurality of social groups to a plurality of message context sensitivities; classify the recipient in a social group of the plurality of social groups; classify the message context in a sensitivity level of the plurality of message context sensitivities; and use a rule from the rule set database to determining whether the message context is consistent with the relationship based on the mapping between the social group and the sensitivity level.

In Example 16, the subject matter of any one of Examples 1 to 15 may include, wherein to present the warning when the message context is not consistent, the presentation module is to: present a graphical user interface control to the sender, the graphical user interface control including a confirmation control to bypass the warning and transmit the message.

Example 17 includes subject matter for a personal messaging assistant (such as a method, means for performing acts, machine readable medium including instructions that when performed by a machine cause the machine to performs acts, or an apparatus to perform) comprising: receiving at a client device, an indication to transmit a message from a sender, the message including a recipient and a body; determining a relationship between the sender and the recipient; determining a message context based on the body; determining whether the message context is consistent with the relationship; and presenting a warning when the message context is not consistent.

In Example 18, the subject matter of Example 17 may include, wherein determining the relationship between the sender and the recipient comprises: accessing a social media platform; querying the social media platform for an attribute of the recipient; and determining an aspect of the relationship between the sender and the recipient based on the attribute of the recipient.

In Example 19, the subject matter of any one of Examples 17 to 18 may include, wherein the attribute of the recipient is a familial role, a workplace, a school, or a social media connection.

In Example 20, the subject matter of any one of Examples 17 to 19 may include, wherein determining the relationship between the sender and the recipient comprises: accessing a computer directory service; querying the computer directory service for an attribute of the recipient; and determining an aspect of the relationship between the sender and the recipient based on the attribute of the recipient.

In Example 21, the subject matter of any one of Examples 17 to 20 may include, wherein the attribute of the recipient is a position, a title, a group membership, a location, an office, or a rank.

In Example 22, the subject matter of any one of Examples 17 to 21 may include, wherein determining the relationship between the sender and the recipient comprises: accessing a contact database; querying the contact database service for an attribute of the recipient; and determining an aspect of the relationship between the sender and the recipient based on the attribute of the recipient.

In Example 23, the subject matter of any one of Examples 17 to 22 may include, wherein the attribute of the recipient is an email distribution list or a company.

In Example 24, the subject matter of any one of Examples 17 to 23 may include, wherein determining the relationship between the sender and the recipient comprises: accessing a user-managed database; and querying the user-managed database for the relationship.

In Example 25, the subject matter of any one of Examples 17 to 24 may include, wherein determining the message context based on the body comprises: implementing a natural language processor to determine a content of the body; and using a rule set to determine the message context based on the content.

In Example 26, the subject matter of any one of Examples 17 to 25 may include, wherein determining the message context based on the body comprises: implementing a blacklist or a whitelist to determine an aspect of the message context; and using a rule set to determine the message context based on the aspect of the message context.

In Example 27, the subject matter of any one of Examples 17 to 26 may include, wherein determining the message context based on the body comprises: determining the message context based on a user-defined set of words.

In Example 28, the subject matter of any one of Examples 17 to 27 may include, wherein the message context comprises a selected one of an ordered list of message context types.

In Example 29, the subject matter of any one of Examples 17 to 28 may include, wherein the message context comprises a mathematical value representing a level of confidentiality.

In Example 30, the subject matter of any one of Examples 17 to 29 may include, wherein determining whether the message context is consistent with the relationship comprises: classifying the relationship on a personal-to-professional scale to obtain a personal-to-professional metric; and comparing the personal-to-professional metric with the message context to determine whether the message context is consistent with the relationship.

In Example 31, the subject matter of any one of Examples 17 to 30 may include, wherein determining whether the message context is consistent with the relationship comprises: accessing a rule set database, the rule set database including mappings from a plurality of social groups to a plurality of message context sensitivities; classifying the recipient in a social group of the plurality of social groups; classifying the message context in a sensitivity level of the plurality of message context sensitivities; and using a rule from the rule set database to determining whether the message context is consistent with the relationship based on the mapping between the social group and the sensitivity level.

In Example 32, the subject matter of any one of Examples 17 to 31 may include, wherein presenting a warning when the message context is not consistent comprises: presenting a graphical user interface control to the sender, the graphical user interface control including a confirmation control to bypass the warning and transmit the message.

Example 33 includes at least one machine-readable medium including instructions, which when executed by a machine, cause the machine to perform operations of any of the Examples 17-32.

Example 34 includes an apparatus comprising means for performing any of the Examples 17-32.

Example 35 includes subject matter for a personal messaging assistant (such as a device, apparatus, or machine) comprising: means for receiving at a client device, an indication to transmit a message from a sender, the message including a recipient and a body; means for determining a relationship between the sender and the recipient; means for determining a message context based on the body; means for determining whether the message context is consistent with the relationship; and means for presenting a warning when the message context is not consistent.

In Example 36, the subject matter of Example 35 may include, wherein the means for determining the relationship between the sender and the recipient comprise: means for accessing a social media platform; means for querying the social media platform for an attribute of the recipient; and means for determining an aspect of the relationship between the sender and the recipient based on the attribute of the recipient.

In Example 37, the subject matter of any one of Examples 35 to 36 may include, wherein the attribute of the recipient is a familial role, a workplace, a school, or a social media connection.

In Example 38, the subject matter of any one of Examples 35 to 37 may include, wherein the means for determining the relationship between the sender and the recipient comprise: means for accessing a computer directory service; means for querying the computer directory service for an attribute of the recipient; and means for determining an aspect of the relationship between the sender and the recipient based on the attribute of the recipient.

In Example 39, the subject matter of any one of Examples 35 to 38 may include, wherein the attribute of the recipient is a position, a title, a group membership, a location, an office, or a rank.

In Example 40, the subject matter of any one of Examples 35 to 39 may include, wherein the means for determining the relationship between the sender and the recipient comprise: means for accessing a contact database; means for querying the contact database service for an attribute of the recipient; and means for determining an aspect of the relationship between the sender and the recipient based on the attribute of the recipient.

In Example 41, the subject matter of any one of Examples 35 to 40 may include, wherein the attribute of the recipient is an email distribution list or a company.

In Example 42, the subject matter of any one of Examples 35 to 41 may include, wherein the means for determining the relationship between the sender and the recipient comprise: means for accessing a user-managed database; and means for querying the user-managed database for the relationship.

In Example 43, the subject matter of any one of Examples 35 to 42 may include, wherein the means for determining the message context based on the body comprise: means for implementing a natural language processor to determine a content of the body; and means for using a rule set to determine the message context based on the content.

In Example 44, the subject matter of any one of Examples 35 to 43 may include, wherein the means for determining the message context based on the body comprise: means for implementing a blacklist or a whitelist to determine an aspect of the message context; and means for using a rule set to determine the message context based on the aspect of the message context.

In Example 45, the subject matter of any one of Examples 35 to 44 may include, wherein the means for determining the message context based on the body comprise: means for determining the message context based on a user-defined set of words.

In Example 46, the subject matter of any one of Examples 35 to 45 may include, wherein the message context comprises a selected one of an ordered list of message context types.

In Example 47, the subject matter of any one of Examples 35 to 46 may include, wherein the message context comprises a mathematical value representing a level of confidentiality.

In Example 48, the subject matter of any one of Examples 35 to 47 may include, wherein the means for determining whether the message context is consistent with the relationship comprise: means for classifying the relationship on a personal-to-professional scale to obtain a personal-to-professional metric; and means for comparing the personal-to-professional metric with the message context to determine whether the message context is consistent with the relationship.

In Example 49, the subject matter of any one of Examples 35 to 48 may include, wherein the means for determining whether the message context is consistent with the relationship comprise: means for accessing a rule set database, the rule set database including mappings from a plurality of social groups to a plurality of message context sensitivities; means for classifying the recipient in a social group of the plurality of social groups; means for classifying the message context in a sensitivity level of the plurality of message context sensitivities; and means for using a rule from the rule set database to determining whether the message context is consistent with the relationship based on the mapping between the social group and the sensitivity level.

In Example 50, the subject matter of any one of Examples 35 to 49 may include, wherein the means for presenting a warning when the message context is not consistent comprise: means for presenting a graphical user interface control to the sender, the graphical user interface control including a confirmation control to bypass the warning and transmit the message.

Example 51 includes subject matter for a personal messaging assistant (such as a device, apparatus, or machine) comprising: a display; a processor; and a memory, including instructions, which when executed on the processor, cause the processor to perform the operations comprising: receiving an indication to transmit a message from a sender, the message including a recipient and a body; determining a relationship between the sender and the recipient; determining a message context based on the body; determining whether the message context is consistent with the relationship; and presenting on the display, a warning when the message context is not consistent.

In Example 52, the subject matter of Example 51 may include, wherein determining the relationship between the sender and the recipient comprises: accessing a social media platform; querying the social media platform for an attribute of the recipient; and determining an aspect of the relationship between the sender and the recipient based on the attribute of the recipient.

In Example 53, the subject matter of any one of Examples 51 to 52 may include, wherein the attribute of the recipient is a familial role, a workplace, a school, or a social media connection.

In Example 54, the subject matter of any one of Examples 51 to 53 may include, wherein determining the relationship between the sender and the recipient comprises: accessing a computer directory service; querying the computer directory service for an attribute of the recipient; and determining an aspect of the relationship between the sender and the recipient based on the attribute of the recipient.

In Example 55, the subject matter of any one of Examples 51 to 54 may include, wherein the attribute of the recipient is a position, a title, a group membership, a location, an office, or a rank.

In Example 56, the subject matter of any one of Examples 51 to 55 may include, wherein determining the relationship between the sender and the recipient comprises: accessing a contact database; querying the contact database service for an attribute of the recipient; and determining an aspect of the relationship between the sender and the recipient based on the attribute of the recipient.

In Example 57, the subject matter of any one of Examples 51 to 56 may include, wherein the attribute of the recipient is an email distribution list or a company.

In Example 58, the subject matter of any one of Examples 51 to 57 may include, wherein determining the relationship between the sender and the recipient comprises: accessing a user-managed database; and querying the user-managed database for the relationship.

In Example 59, the subject matter of any one of Examples 51 to 58 may include, wherein determining the message context based on the body comprises: implementing a natural language processor to determine a content of the body; and using a rule set to determine the message context based on the content.

In Example 60, the subject matter of any one of Examples 51 to 59 may include, wherein determining the message context based on the body comprises: implementing a blacklist or a whitelist to determine an aspect of the message context; and using a rule set to determine the message context based on the aspect of the message context.

In Example 61, the subject matter of any one of Examples 51 to 60 may include, wherein determining the message context based on the body comprises: determining the message context based on a user-defined set of words.

In Example 62, the subject matter of any one of Examples 51 to 61 may include, wherein the message context comprises a selected one of an ordered list of message context types.

In Example 63, the subject matter of any one of Examples 51 to 62 may include, wherein the message context comprises a mathematical value representing a level of confidentiality.

In Example 64, the subject matter of any one of Examples 51 to 63 may include, wherein determining whether the message context is consistent with the relationship comprises: classifying the relationship on a personal-to-professional scale to obtain a personal-to-professional metric; and comparing the personal-to-professional metric with the message context to determine whether the message context is consistent with the relationship.

In Example 65, the subject matter of any one of Examples 51 to 64 may include, wherein determining whether the message context is consistent with the relationship comprises: accessing a rule set database, the rule set database including mappings from a plurality of social groups to a plurality of message context sensitivities; classifying the recipient in a social group of the plurality of social groups; classifying the message context in a sensitivity level of the plurality of message context sensitivities; and using a rule from the rule set database to determining whether the message context is consistent with the relationship based on the mapping between the social group and the sensitivity level.

In Example 66, the subject matter of any one of Examples 51 to 65 may include, wherein presenting the warning when the message context is not consistent comprises: presenting a graphical user interface control to the sender, the graphical user interface control including a confirmation control to bypass the warning and transmit the message.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A personal messaging assistant system comprising:
   a receive circuit to receive an indication to transmit a message from a sender, the message including a recipient and a body;
   a relationship circuit to determine a relationship between the sender and the recipient;
   a message analyzer module circuit to determine a message context based on the body and to determine whether the message context is consistent with the relationship, wherein to determine the message context, the message analyzer circuit is to:
     access a rule set database, the rule set database including mappings from a plurality of social groups to a plurality of message context sensitivities, the message context sensitivities measured with respect to confidentiality;
     classify the recipient into a social group of the plurality of social groups;
     classify the message context in a sensitivity level of the plurality of message context sensitivities; and
     use a rule from the rule set database to determine whether the message context is consistent with the relationship based on a mapping from the mappings, between the social group and the sensitivity level; and
   a presentation circuit to present a warning when the message context is not consistent.

2. The system of claim 1, wherein to determine the relationship between the sender and the recipient, the relationship circuit is to:
   access a social media platform;
   query the social media platform for an attribute of the recipient; and
   determine an aspect of the relationship between the sender and the recipient based on the attribute of the recipient.

3. The system of claim 2, wherein the attribute of the recipient is a familial role, a workplace, a school, or a social media connection.

4. The system of claim 1, wherein to determine the relationship between the sender and the recipient, the relationship circuit is to:
   access a computer directory service;
   query the computer directory service for an attribute of the recipient; and
   determine an aspect of the relationship between the sender and the recipient based on the attribute of the recipient.

5. The system of claim 4, wherein the attribute of the recipient is a position, a title, a group membership, a location, an office, or a rank.

6. The system of claim 1, wherein to determine the relationship between the sender and the recipient, the relationship circuit is to:
   access a contact database;
   query the contact database service for an attribute of the recipient; and
   determine an aspect of the relationship between the sender and the recipient based on the attribute of the recipient.

7. The system of claim 6, wherein the attribute of the recipient is an email distribution list or a company.

8. The system of claim 1, wherein to determine the relationship between the sender and the recipient, the relationship circuit is to:
   access a user-managed database; and
   query the user-managed database for the relationship.

9. The system of claim 1, wherein to determine the message context based on the body, the message analyzer circuit is to:
   implement a natural language processor to determine a content of the body; and
   use a rule set to determine the message context based on the content.

10. The system of claim 1, wherein to determine the message context based on the body, the message analyzer circuit is to:
    implement a blacklist or a whitelist to determine an aspect of the message context; and
    use a rule set to determine the message context based on the aspect of the message context.

11. The system of claim 1, wherein to determine the message context based on the body, the message analyzer circuit is to:
    determine the message context based on a user-defined set of words.

12. The system of claim 1, wherein the message context comprises a selected one of an ordered list of message context types.

13. The system of claim 1, wherein the message context comprises a mathematical value representing a level of confidentiality.

14. The system of claim 1, wherein to determine whether the message context is consistent with the relationship, the message analyzer circuit is to:
    classify the relationship on a personal-to-professional scale to obtain a personal-to-professional metric; and
    compare the personal-to-professional metric with the message context to determine whether the message context is consistent with the relationship.

15. The system of claim 1, wherein to present the warning when the message context is not consistent, the presentation circuit is to:
    present a user interface control to the sender, the user interface control including a confirmation control to bypass the warning and transmit the message.

16. A method for providing a personal messaging assistant, the method comprising:
    receiving at a client device, an indication to transmit a message from a sender, the message including a recipient and a body;
    determining a relationship between the sender and the recipient;
    determining a message context based on the body, wherein determining the message context includes:
      accessing a rule set database, the rule set database including mappings from a plurality of social groups to a plurality of message context sensitivities, the message context sensitivities measured with respect to confidentiality;
      classifying the recipient into a social group of the plurality of social groups;
      classifying the message context in a sensitivity level of the plurality of message context sensitivities; and using a rule from the rule set database to determine whether the message context is consistent with the relationship based on a mapping from the mappings, between the social group and the sensitivity level;

determining whether the message context is consistent with the relationship; and presenting a warning when the message context is not consistent.

17. The method of claim 16, wherein determining the relationship between the sender and the recipient comprises:

accessing a social media platform;

querying the social media platform for an attribute of the recipient; and determining an aspect of the relationship between the sender and the recipient based on the attribute of the recipient.

18. The method of claim 16, wherein determining the relationship between the sender and the recipient comprises:

accessing a computer directory service;

querying the computer directory service for an attribute of the recipient; and determining an aspect of the relationship between the sender and the recipient based on the attribute of the recipient.

19. The method of claim 16, wherein determining the relationship between the sender and the recipient comprises:

accessing a contact database;

querying the contact database service for an attribute of the recipient; and determining an aspect of the relationship between the sender and the recipient based on the attribute of the recipient.

20. A personal messaging assistant system comprising:

a display;

a processor; and a memory, including instructions, which when executed on the processor, cause the processor to perform the operations comprising:

receiving an indication to transmit a message from a sender, the message including a recipient and a body;

determining a relationship between the sender and the recipient;

determining a message context based on the body, wherein determining the message context includes:

accessing a rule set database, the rule set database including mappings from a plurality of social groups to a plurality of message context sensitivities, the message context sensitivities measured with respect to confidentiality;

classifying the recipient into a social group of the plurality of social groups;

classifying the message context in a sensitivity level of the plurality of message context sensitivities; and using a rule from the rule set database to determine whether the message context is consistent with the relationship based on a mapping from the mappings, between the social group and the sensitivity level;

determining whether the message context is consistent with the relationship; and presenting on the display, a warning when the message context is not consistent.

21. The system of claim 20, wherein determining the relationship between the sender and the recipient comprises:

accessing a social media platform;

querying the social media platform for an attribute of the recipient; and determining an aspect of the relationship between the sender and the recipient based on the attribute of the recipient.

22. The system of claim 20, wherein presenting the warning when the message context is not consistent comprises:

presenting a graphical user interface control to the sender, the graphical user interface control including a confirmation control to bypass the warning and transmit the message.

23. At least one non-transitory machine-readable medium including instructions, which when executed by a machine, cause the machine to:

receive an indication to transmit a message from a sender, the message including a recipient and a body;

determine a relationship between the sender and the recipient;

determine a message context based on the body, wherein to determine the message context, the instructions cause the machine to:

access a rule set database, the rule set database including mappings from a plurality of social groups to a plurality of message context sensitivities, the message context sensitivities measured with respect to confidentiality;

classify the recipient into a social group of the plurality of social groups;

classify the message context in a sensitivity level of the plurality of message context sensitivities; and use a rule from the rule set database to determine whether the message context is consistent with the relationship based on a mapping from the mappings, between the social group and the sensitivity level;

determine whether the message context is consistent with the relationship; and present on a display, a warning when the message context is not consistent.

24. The at least one non-transitory machine-readable medium of claim 23, wherein the instructions to present the warning comprise instructions to:

present a graphical user interface control to the sender, the graphical user interface control including a confirmation control to bypass the warning and transmit the message.

* * * * *

UNITED STATES PATENT AND TRADEMARK OFFICE
CERTIFICATE OF CORRECTION

PATENT NO. : 10,594,648 B2
APPLICATION NO. : 14/865958
DATED : March 17, 2020
INVENTOR(S) : Harihara Iyer et al.

It is certified that error appears in the above-identified patent and that said Letters Patent is hereby corrected as shown below:

In the Claims

In Column 21, Line 19, in Claim 1, after "analyzer", delete "module"

In Column 23, Line 52, in Claim 20, delete "groups:" and insert --groups;-- therefor Signed and Sealed this
Thirteenth Day of October, 2020

Andrei Iancu
*Director of the United States Patent and Trademark Office*